Patented Aug. 1, 1939

2,167,719

UNITED STATES PATENT OFFICE 2,167,719

P-AMINOBENZENE-SULPHONAMIDE MALT-OSIDE AND PROCESS OF PREPARING THE SAME

Harry Klingel and William C. MacLennan, Rensselaer, N. Y., assignors to Winthrop Chemical Company, Inc., New York, N. Y., a corporation of New York No Drawing. Application August 6, 1938, Serial No. 223,451

3 Claims. (Cl. 260—211)

This invention relates to a soluble p-aminobenzene-sulphonamide maltoside and to a process for making it.

It is known that p-aminobenzene-sulphonamide will condense with glucose (dextrose) to yield a product described as a glucoside. This product is not sufficiently soluble in water to have any therapeutic advantage over the parent p-aminobenzene-sulphonamide.

If, however, para-aminobenzene-sulphonamide is condensed with maltose, under suitable conditions, two new compounds are formed, one of which is soluble in water, while the other is insoluble in water.

Our new soluble product has the valuable property of being freely soluble in water and still retains the therapeutic activity of the relatively insoluble p-aminobenzene-sulphonamide.

In general, our process for preparing this new compound comprises heating a methyl alcohol solution of equal moles of p-aminobenzene-sulphonamide and maltose, with or without the addition of a trace of ammonium chloride as a catalyst. This alcoholic solution is evaporated to a syrup which is dried in vacuum.

The use of larger quantities of maltose, than the equal moles theoretically required, does not alter the course of the reaction nor materially affect the solubility or therapeutic activity of the product.

If the condensation between the maltose and p-aminobenzene-sulphonamide is carried out in the presence of comparatively large amounts of ammonium chloride, i. e., three or more percent, based on the amount of p-aminobenzene-sulphonamide employed, a quite different product is obtained. This product is comparatively insoluble in cold water, is crystalline and rotates polarized light to the left. The soluble maltoside derivative, however, can be produced from this insoluble product by suitable treatment as will be explained hereinafter. The soluble product, therefore, can be prepared in at least two ways, i. e., by direct combination of maltose and p-aminobenzene-sulphonamide under suitable conditions or by transformation of the insoluble crystalline compound into the soluble product.

The following specific examples illustrate the invention, but the invention is not limited to the examples.

Example 1

17.2 gms. of p-aminobenzene-sulphonamide are dissolved by warming in 150 cc. of methyl alcohol and then 36.0 gms. maltose are added. On heating, the maltose quickly dissolves. The solution is boiled under reflux for 3 hours to complete the reaction. The clear solution is evaporated to a syrup, then dried in a vacuum to yield a fluffy mass which may be easily pulverized.

The new compound is a white powder freely soluble in water in the cold to a colorless solution, approximately neutral in reaction.

The addition of a water solution of formaldehyde or furfuraldehyde to the solution does not yield a precipitate. Under similar conditions a water solution of p-aminobenzene-sulphonamide yields a precipitate.

The aqueous solution rotates polarized light to the right.

The solution in methyl alcohol has a similar rotation.

The aqueous solution is readily hydrolyzed by mineral acids and the resultant p-aminobenzene-sulphonamide may be quantitatively determined by titration with sodium nitrite.

Example 2

17.2 gms. of p-aminobenzene-sulphonamide are dissolved by warming in 150 cc. of methyl alcohol and 40.0 gms. of maltose and 0.02 gm. of ammonium chloride are added. The solution is boiled under reflux for 3 hours and evaporated to a syrup, and then finally dried in a vacuum.

Example 3

17.2 gms. of p-aminobenzene-sulphonamide are dissolved by warming in 150 cc. methyl alcohol and 38 gms. of maltose and 0.5 gm. of ammonium chloride are added. The solution is then boiled under reflux for 5 hours, cooled and the formed crystals filtered off. The crystals are soluble in hot water, but relatively insoluble (only about 2%) in cold water. They are recrystallized from water and dried.

An aqueous solution of such crystals rotates polarized light to the left.

Example 4

The same product as is obtained in Example 3 can be obtained by dissolving 10 gms. of the soluble maltoside of Examples 1 or 2 in 50 cc. methanol, adding 0.2 gm. of ammonium chloride, boiling the solution under reflux for 3 hours, allowing to cool over night and filtering off the crystals formed. The crystals are washed with methanol and recrystallized from water.

Example 5

It is also possible to convert the insoluble product of Examples 3 or 4 into the soluble product of Examples 1 or 2. In order to secure this result, 10 gms. of the insoluble maltoside of Examples 3 or 4 are heated to solution in 90 cc. of water and 0.5 cc. of N/1 HCl then added. The solution is heated at 75° C. for 40 minutes and 0.5 cc. N/1 NaOH added. The water is then distilled off under vacuum until a syrup is formed. 90 cc. of methanol are then added, the material redistilled to a syrup and dried under vacuum. A fluffy mass is obtained which can easily be reduced to a powder. It is readily soluble in water or methanol.

The degree of specific rotation of the above described products varies somewhat with the purity of the products obtained. For the soluble maltoside in a 4% aqueous solution alpha (D) ranges between about plus 50–80°. For the product of Example 5 alpha (D) is about plus 68°. For the insoluble maltoside the rotation is more exact. This product, in a 4% aqueous solution, gives a value for alpha (D) of about minus 12°–14°. The melting point of the insoluble maltoside is about 236° C.

If ethyl alcohol be substituted for methanol in Examples 1 and 2, the p-aminobenzene-sulphonamide reacts only incompletely, a mixture of maltose, p-aminobenzene-sulphonamide and the soluble and insoluble maltosides being obtained.

This application is a continuation-in-part of our prior application Serial No. 194,077 filed March 5, 1938.

We claim:

1. The p-aminobenzene-sulphonamide maltoside which is freely soluble in cold water and gives a value for alpha (D) in 4% aqueous solution of about +50°–80°.

2. The process of preparing soluble p-aminobenzene-sulphonamide maltoside which comprises reacting equal moles of p-aminobenzene-sulphonamide and maltose in methanol solution.

3. The process of preparing a soluble p-aminobenzene-sulphonamide maltoside which comprises reacting p-aminobenzene-sulphonamide and maltose in methanol solution in the presence of a small amount of ammonium chloride as a catalyst.

HARRY KLINGEL.
WILLIAM C. MacLENNAN.